United States Patent
Smith et al.

(10) Patent No.: US 11,098,666 B1
(45) Date of Patent: Aug. 24, 2021

(54) SYSTEM AND METHOD FOR CONTROLLING AMOUNT OF SULFUR ON THREE-WAY CATALYST BY LIMITING DECELERATION CYLINDER CUT OFF

(71) Applicant: GM GLOBAL TECHNOLOGY OPERATIONS LLC, Detroit, MI (US)

(72) Inventors: Michael A. Smith, Clarkston, MI (US); Vijay A. Ramappan, Novi, MI (US); Michael J. Lucido, Northville, MI (US); Jeffrey M. Hutmacher, Fowlerville, MI (US); Scott T. Feldmann, South Lyon, MI (US); Randy L. Dufresne, Orchard Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/035,088

(22) Filed: Sep. 28, 2020

(51) Int. Cl.
| | |
|---|---|
| *F02D 13/06* | (2006.01) |
| *F02D 41/00* | (2006.01) |
| *F02D 13/02* | (2006.01) |
| *F02D 41/30* | (2006.01) |
| *F02D 41/14* | (2006.01) |
| *F02D 41/02* | (2006.01) |

(52) U.S. Cl.
CPC ..... *F02D 41/0087* (2013.01); *F02D 13/0203* (2013.01); *F02D 13/06* (2013.01); *F02D 41/0002* (2013.01); *F02D 41/024* (2013.01); *F02D 41/0295* (2013.01); *F02D 41/1445* (2013.01); *F02D 41/1446* (2013.01); *F02D 41/1454* (2013.01); *F02D 41/30* (2013.01); *F02D 2041/0012* (2013.01); *F02D 2200/0802* (2013.01); *F02D 2200/0816* (2013.01)

(58) Field of Classification Search
CPC ............. F02D 41/0087; F02D 41/1445; F02D 41/0002; F02D 41/024; F02D 41/30; F02D 41/1454; F02D 41/0295; F02D 41/1446; F02D 13/0203; F02D 13/06; F02D 2041/0012; F02D 2200/0802; F02D 2200/0816
USPC ........ 123/320, 321, 325, 675, 682; 701/103, 701/110; 60/285, 286
See application file for complete search history.

(56) References Cited

U.S. PATENT DOCUMENTS

| | | | |
|---|---|---|---|
| 9,046,051 B2 * | 6/2015 | Narayanaswamy | .. F02D 41/024 |
| 10,704,504 B1 * | 7/2020 | Smith | ..... F02D 41/12 |
| 10,794,249 B2 * | 10/2020 | Kaneko | ...... F01N 3/023 |

* cited by examiner

*Primary Examiner* — Hai H Huynh
(74) *Attorney, Agent, or Firm* — Harness, Dickey & Pierce, P.L.C.

(57) ABSTRACT

A system includes a three-way catalyst (TWC) sulfur load module, a cylinder/fuel cutoff module, a fuel control module, and a valve control module. The TWC sulfur load module is configured to determine an amount of sulfur deposited on a three-way catalyst of an engine in a vehicle. The cylinder/fuel cutoff module is configured to determine whether to enable deceleration cylinder cutoff (DCCO) based on the amount of sulfur deposited on the three-way catalyst. The fuel control module is configured to control a fuel injector to selectively stop fuel injection in the engine when DCCO is enabled. The valve control module is configured to selectively maintain intake and exhaust valves of the engine in a closed position when DCCO is enabled.

20 Claims, 3 Drawing Sheets

SYSTEM AND METHOD FOR CONTROLLING AMOUNT OF SULFUR ON THREE-WAY CATALYST BY LIMITING DECELERATION CYLINDER CUT OFF

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for controlling the amount of sulfur on a three-way catalyst by limiting deceleration cylinder cut off.

Some engine control systems perform deceleration fuel cutoff (DFCO) or deceleration cylinder cutoff (DCCO) when a vehicle is decelerating to improve the fuel efficiency of the engine. During DFCO, the engine control systems prevent (or cut off) fuel flow to all cylinders of an engine while allowing air to flow through the cylinders. During DCCO, the engine control systems prevent fuel flow to all cylinders of an engine and prevent airflow to all of the cylinders.

SUMMARY

An example of a system according to the present disclosure includes a three-way catalyst (TWC) sulfur load module, a cylinder/fuel cutoff module, a fuel control module, and a valve control module. The TWC sulfur load module is configured to determine an amount of sulfur deposited on a three-way catalyst of an engine in a vehicle. The cylinder/fuel cutoff module is configured to determine whether to enable deceleration cylinder cutoff (DCCO) based on the amount of sulfur deposited on the three-way catalyst. The fuel control module is configured to control a fuel injector to selectively stop fuel injection in the engine when DCCO is enabled. The valve control module is configured to selectively maintain intake and exhaust valves of the engine in a closed position when DCCO is enabled.

In one example, when DCCO is enabled, the TWC sulfur load module is configured to selectively determine the amount of sulfur deposited on the three-way catalyst based on a previous value of the amount of sulfur deposited on the three-way catalyst and an increase in the amount of sulfur deposited on the three-way catalyst during a current engine cycle.

In one example, when DCCO is enabled and an air/fuel ratio of the engine is stoichiometric or rich, the TWC sulfur load module is configured to determine the amount of sulfur deposited on the three-way catalyst based on the previous value of the amount of sulfur deposited on the three-way catalyst and the increase in the amount of sulfur deposited on the three-way catalyst during the current engine cycle.

In one example, the TWC sulfur load module is configured to determine the increase in the amount of sulfur deposited on the three-way catalyst during the current engine cycle based on a commanded fuel injection amount and a level of sulfur in fuel combusted by the engine.

In one example, the cylinder/fuel cutoff module is configured to enable one of DCCO and deceleration fuel cutoff (DFCO) based on the amount of sulfur deposited on the three-way catalyst, the fuel control module is configured to control the fuel injector to selectively stop fuel injection in the engine when one of DCCO and DFCO is enabled, and the valve control module is configured to enable actuation of the intake and exhaust valves between an open position and the closed position when DFCO is enabled.

In one example, the cylinder/fuel cutoff module is configured to activate DFCO when DFCO is enabled and the vehicle is decelerating, and the fuel control module is configured to control the fuel injector to stop fuel delivery to all cylinders of the engine when DFCO is active.

In one example, the cylinder/fuel cutoff module is configured to selectively enable DFCO when the amount of sulfur deposited on the three-way catalyst is greater than a first mass.

In one example, the cylinder/fuel cutoff module is configured to enable DFCO when the amount of sulfur deposited on the three-way catalyst is greater than the first mass and a temperature of the three-way catalyst is greater than a first temperature.

In one example, the cylinder/fuel cutoff module is configured to enable DCCO when at least one of the amount of sulfur deposited on the three-way catalyst is less than or equal to the first mass and the temperature of the three-way catalyst is less than or equal to the first temperature.

In one example, the cylinder/fuel cutoff module is configured to activate DCCO when DCCO is enabled and the vehicle is decelerating, the fuel control module is configured to control the fuel injector to stop fuel delivery to all cylinders of the engine when DCCO is active, and the valve control module is configured to maintain the intake and exhaust valves of all cylinders in the engine in the closed position when DCCO is active.

In one example, the system further includes a three-way catalyst (TWC) temperature module configured to increase the temperature of the three-way catalyst when the amount of sulfur deposited on the three-way catalyst is greater than a second mass. The second mass is greater than the first mass.

In one example, the TWC temperature module is configured to increase the temperature of the three-way catalyst by instructing the fuel control module to increase an amount of fuel injected into cylinders of the engine and instructing the valve control module to increase a rate of airflow to the cylinders.

In one example, when DFCO is enabled, the TWC sulfur load module is configured to determine the amount of sulfur deposited on the three-way catalyst based on a previous value of the amount of sulfur deposited on the three-way catalyst and a decrease in the amount of sulfur deposited on the three-way catalyst during a current engine cycle.

In one example, the TWC sulfur load module is configured to determine the decrease in the amount of sulfur deposited on the three-way catalyst during the current engine cycle based on a temperature of exhaust gas produced by the engine, a flow rate of exhaust gas produced by the engine, a flow rate of oxygen passing through the three-way catalyst, and an oxygen storage capacity of the three-way catalyst.

In one example, the system further includes an oxygen storage capacity module configured to determine the oxygen storage capacity of the three-way catalyst based on an input from an oxygen sensor disposed at an inlet of the three-way catalyst and an input from an oxygen sensor disposed at an outlet of the three-way catalyst or between the inlet and the outlet.

Another example of a system according to the present disclosure includes a three-way catalyst (TWC) sulfur load module, a cylinder/fuel cutoff module, a fuel control module, and a valve control module. The TWC sulfur load module is configured to determine an amount of sulfur deposited on a three-way catalyst of an engine in a vehicle. The cylinder/fuel cutoff module is configured to enable deceleration cylinder cutoff (DCCO) when at least one of the amount of sulfur deposited on the three-way catalyst is less than or equal to a first mass, and a temperature of the three-way catalyst is less than or equal to a first temperature. The cylinder/fuel cutoff module is configured to enable deceleration fuel cutoff (DFCO) when the amount of sulfur deposited on the three-way catalyst is greater than the first mass and the temperature of the three-way catalyst is greater than the first temperature. The fuel control module is configured to control a fuel injector to stop fuel injection in the engine when one of DCCO and DFCO is enabled and the vehicle is decelerating. The valve control module is configured to maintain intake and exhaust valves of the engine in a closed position when DCCO is enabled and the vehicle is decelerating, and enable actuation of the intake and exhaust valves between an open position and the closed position when DFCO is enabled.

In one example, when DCCO is enabled, the TWC sulfur load module is configured to determine that the amount of sulfur deposited on the three-way catalyst is equal to a sum of a previous value of the amount of sulfur deposited on the three-way catalyst and an increase in the amount of sulfur deposited on the three-way catalyst during a current engine cycle.

In one example, the TWC sulfur load module is configured to determine that the increase in the amount of sulfur deposited on the three-way catalyst during the current engine cycle is equal to a product of a commanded fuel injection amount and a level of sulfur in fuel combusted by the engine.

In one example, when DFCO is enabled, the TWC sulfur load module is configured to determine that the amount of sulfur deposited on the three-way catalyst is equal to a difference between a previous value of the amount of sulfur deposited on the three-way catalyst and a decrease in the amount of sulfur deposited on the three-way catalyst during a current engine cycle.

In one example, the TWC sulfur load module is configured to determine the decrease in the amount of sulfur deposited on the three-way catalyst during the current engine cycle based on a temperature of exhaust gas produced by the engine, a flow rate of exhaust gas produced by the engine, a flow rate of oxygen passing through the three-way catalyst, and an oxygen storage capacity of the three-way catalyst.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

DFCO operation may be less fuel efficient than DCCO operation due to pumping losses associated with allowing airflow through the cylinders during DFCO operation. Thus, some engine control systems primarily perform DCCO (as opposed to DFCO) when a vehicle is decelerating. However, during normal engine operation, sulfur from combustion byproducts is deposited on a three-way catalyst in an exhaust system of an engine, and performing DCCO does not reduce the buildup of sulfur on the three-way catalyst. Once the buildup of sulfur on the thee-way catalyst reaches a certain level, nitrogen oxide (NOx) slip may occur.

To prevent this issue, an engine control system according to the present disclosure estimates the sulfur buildup on a three-way catalyst and determines whether to perform DFCO or DCCO based on the estimated sulfur buildup.

Performing DFCO exposes the three-way catalyst to oxygen, which reduces the sulfur buildup on the three-way catalyst. In one example, the engine control system normally performs DCCO when the vehicle is decelerating. However, when the sulfur buildup reaches a certain level, the engine control system performs DFCO when the vehicle is decelerating. In this manner, the engine control system maximizes the fuel efficiency of the engine while preventing NOx slip.

Figure 1:
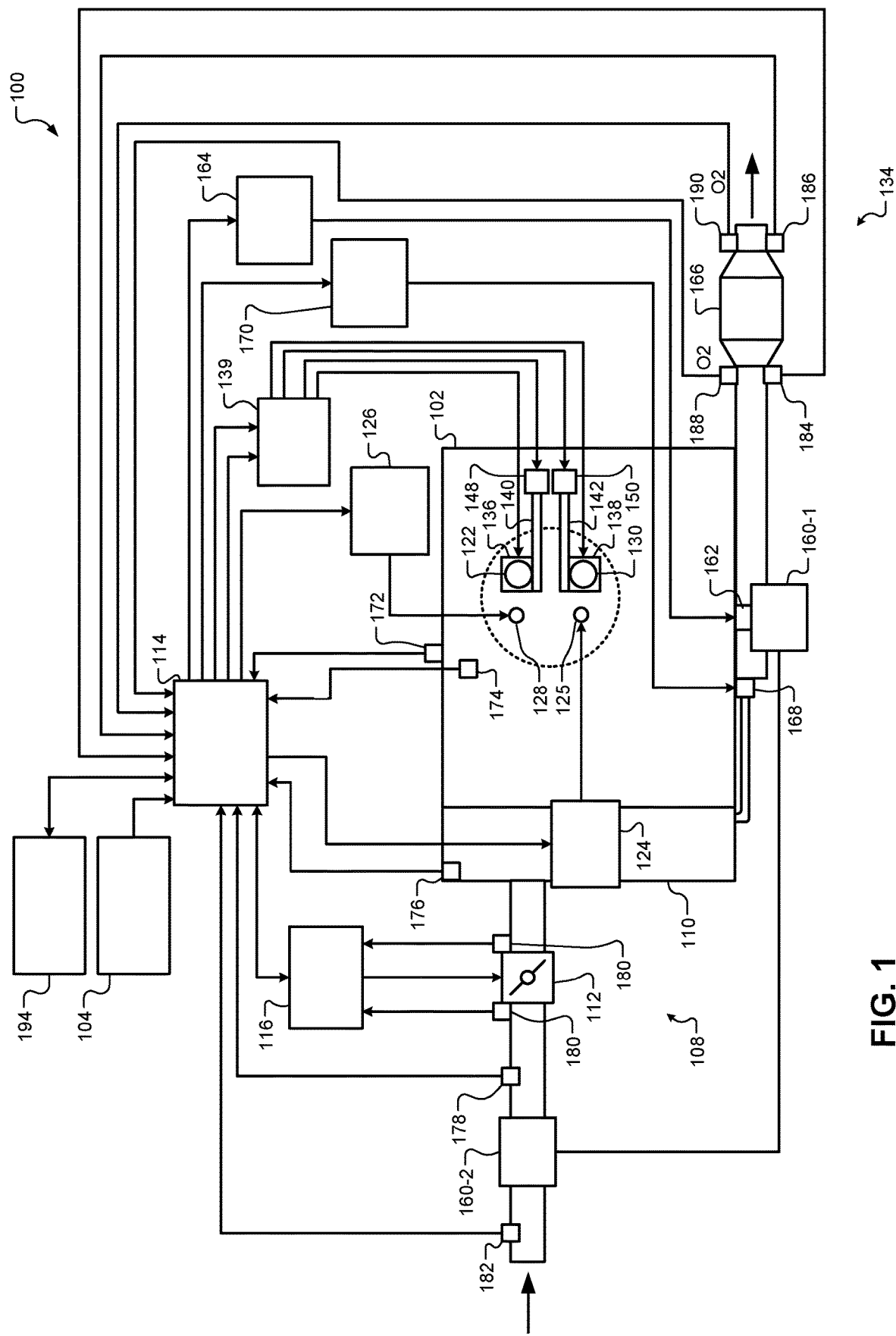
FIG. 1 is a functional block diagram of an example vehicle according to the principles of the present disclosure.

Referring now to FIG. 1, a vehicle 100 includes an engine 102 that combusts an air/fuel mixture to produce drive torque for a vehicle. The amount of drive torque produced by the engine 102 is based on a driver torque request from a torque request module 104. The torque request module 104 may generate the driver torque request based on a position of an accelerator pedal and/or a speed setting of a cruise control system (not shown). The cruise control system may be an adaptive cruise control system that varies vehicle speed to maintain a predetermined following distance.

Air is drawn into the engine 102 through an intake system 108. The intake system 108 includes an intake manifold 110 and a throttle valve 112. The throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injections performed by a fuel injector 125 to achieve a desired air/fuel ratio. Fuel may be injected into the intake manifold 110 at a central location or at multiple locations, such as near the intake valve 122 of each of the cylinders. In various implementations, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 to generate a spark in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a spark timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 is actuated using an intake valve actuator 136, while the exhaust valve 130 is actuated using an exhaust valve actuator 138. A valve actuator module 139 may control the intake and exhaust valve actuators 136 and 138 based on signals from the ECM 114. In various implementations, the intake valve actuator 136 may actuate multiple intake valves (including the intake valve 122) of the cylinder 118. Similarly, the exhaust valve actuator 138 may actuate multiple exhaust valves (including the exhaust valve 130) of the cylinder 118. Additionally, a single valve actuator may actuate one or more exhaust valves of the cylinder 118 and one or more intake valves of the cylinder 118. Further, the intake valve actuator 136 may actuate multiple intake valves of multiple cylinders, and the exhaust valve actuator 138 may actuate multiple exhaust valves of multiple cylinders.

In various implementations, the intake valve actuator 136 may be driven by an intake camshaft 140, and the exhaust valve actuator 138 may be driven by an exhaust camshaft 142. For example, the intake valve actuator 136 may include a rocker arm and a cam follower coupled to the rocker arm. The rocker arm may lift the intake valve 122 from its valve seat when the cam follower engages a lobe on the intake camshaft 140. Similarly, the exhaust valve actuator 138 may include a rocker arm and a cam follower coupled to the rocker arm. The rocker arm may lift the exhaust valve 130 from its valve seat when the cam follower engages a lobe on the exhaust camshaft 142.

In other implementations, the intake and exhaust valve actuators 136 and 138 may actuate the intake and exhaust valves 122 and 130 independent of a camshaft. For example, the intake and exhaust valves 122 and 130 may be electromagnetic or electrohydraulic valve actuators. In these implementations, the intake and exhaust valve actuators 136 and 138 may be referred to as camless valve actuators.

The intake and exhaust valve actuators 136 and 138 may vary the amount by which the intake and exhaust valves 122 and 130 are lifted from their respective valve seats. For example, the intake and exhaust valve actuators 136 and 138 may switch between a first lift state and a second lift state. The intake and exhaust valve actuators 136 and 138 may cause the intake and exhaust valves 122 and 130 to lift from their respective valve seats by a first amount when operating in the first lift state. The intake and exhaust valve actuators 136 and 138 may cause the intake and exhaust valves 122 and 130 to lift from their respective valve seats by a second amount when operating in the second lift state. The first and second amounts may be predetermined, nonzero values. In addition, the second amount may be greater than the first amount. In this regard, the first lift state may be referred to as a low lift state, and the second lift state may be referred to as a high lift state.

When the intake and exhaust valve actuators 136 and 138 are cam driven, each of the intake and exhaust valve actuators 136 and 138 may include a cam follower having a height that is adjustable to vary the lift of the intake and exhaust valves 122 and 130. Alternatively, each of the intake and exhaust valve actuators 136 and 138 may include a solenoid that translates a camshaft segment along the length of one of the camshafts 140 and 142 to cause a cam follower to engage different lobes on the camshaft segment. The lobes may have different heights so that switching which one of the lobes the cam follower engages varies the lift of the intake and exhaust valves 122 and 130. Valve actuators such as these may be referred to as sliding cam actuators.

When the intake and exhaust valve actuators 136 and 138 are camless valve actuators, the valve actuators 136 and 138 may also adjust the timing of the intake and exhaust valves 122 and 130, respectively. When the intake and exhaust valve actuators 136 and 138 are cam driven, the timing of the intake and exhaust valves 122 and 130 may be adjusted by intake and exhaust cam phasers 148, 150, respectively. The valve actuator module 139 may adjust the position of the intake and exhaust cam phasers 148, 150 based on signals received from the ECM 114.

The ECM 114 may deactivate the cylinder 118 by instructing the valve actuator module 139 to disable opening of the intake valve 122 and/or the exhaust valve 130. When the intake valve actuator 136 is cam driven, the intake valve actuator 136 may disable opening of the intake valve 122 by decoupling the intake valve 122 from the intake camshaft 140. Similarly, when the exhaust valve actuator 138 is cam driven, the exhaust valve actuator 138 may disable opening of the exhaust valve 130 by decoupling the exhaust valve 130 from the exhaust camshaft 142.

In various implementations, the valve actuator module 139 may disable opening of the intake and exhaust valves 122 and 130 by switching the intake and exhaust valve actuators 136 and 138 to a third lift state. The intake and exhaust valve actuators 136 and 138 may lift the intake and exhaust valves 122 and 130 from their respective valve seats by a third amount when operating in the third lift state. The third amount may be zero. Thus, the third lift state may be referred to as a zero lift state.

The vehicle 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, which compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The exhaust system 134 may include a three-way catalyst 166 and an exhaust gas recirculation (EGR) valve 168. When the air/fuel ratio of the engine 102 is rich or stoichiometric, the three-way catalyst 166 reduces hydrocarbon, carbon monoxide, and nitrogen oxide. When the air/fuel ratio is lean, the three-way catalyst 166 reduces hydrocarbon and carbon monoxide. The EGR valve 168 selectively redirects exhaust gas back to the intake manifold 110. The EGR valve 168 may be located upstream of the turbocharger's turbine 160-1. The EGR valve 168 may be controlled by an EGR actuator module 170.

The position of the crankshaft may be measured using a crankshaft position (CKP) sensor 172. The temperature of the engine coolant may be measured using an engine coolant temperature (ECT) sensor 174. The ECT sensor 174 may be located within the engine 102 or at other locations where the coolant is circulated, such as a radiator (not shown).

The pressure within the intake manifold 110 may be measured using a manifold absolute pressure (MAP) sensor 176. In various implementations, engine vacuum, which is the difference between ambient air pressure and the pressure within the intake manifold 110, may be measured. The mass flow rate of air flowing into the intake manifold 110 may be measured using a mass air flow (MAF) sensor 178. In various implementations, the MAF sensor 178 may be located in a housing that also includes the throttle valve 112.

The throttle actuator module 116 may measure the position of the throttle valve 112 using one or more throttle position sensors (TPS) 180. The temperature of ambient air being drawn into the engine 102 may be measured using an intake air temperature (IAT) sensor 182. The temperature of exhaust gas produced by the engine 102 may be measured using an exhaust gas temperature (EGT) sensor 184. The flow rate of exhaust gas produced by the engine 102 may be measured using an exhaust gas flow (EGF) sensor 186

The level of oxygen in exhaust gas entering the three-way catalyst 166 may be measured using an upstream oxygen (UO2) sensor 188. The UO2 sensor 188 may be located at the inlet of the three-way catalyst 166. The level of oxygen in exhaust gas passing through or exiting the three-way catalyst 166 may be measured using a downstream oxygen sensor (DO2) sensor 190. The DO2 sensor 190 may be located at the outlet of the three-way catalyst 166 or midway between the inlet and outlet of the three-way catalyst 166.

The ECM 114 uses signals from the sensors to make control decisions for the vehicle 100. In one example, the ECM 114 determines the amount of sulfur deposited on the three-way catalyst 166 (the TWC sulfur load), and enables deceleration fuel cutoff (DFCO) or deceleration cylinder cutoff (DCCO) based on the TWC sulfur load. When DFCO is enabled and the vehicle 100 is decelerating, the ECM 114 stops fuel injection in all cylinders of the engine 102 while allowing airflow through the cylinders. When DCCO is enabled and the vehicle 100 is decelerating, the ECM 114 stops fuel injection in all cylinders of the engine 102 and prevents airflow through all cylinders of the engine 102. The ECM 114 may determine whether the vehicle 100 is decelerating based on an input from a vehicle (or wheel) speed sensor (not shown). The ECM 114 may control the fuel injectors of the engine 102 (including the fuel injector 125) to regulate fuel injection in the engine 102. The ECM 114 may control the valve actuators of the engine 102 (including the intake and exhaust valve actuators 136 and 138) to regulate airflow through the cylinders.

The ECM 114 may communicate with a transmission control module (TCM) 194 to coordinate shifting gears in a transmission (not shown). For example, the ECM 114 may reduce engine torque during a gear shift. In various implementations, various functions of the ECM 114 and the TCM 194 may be integrated into a single module or more than two modules.

Figure 2:
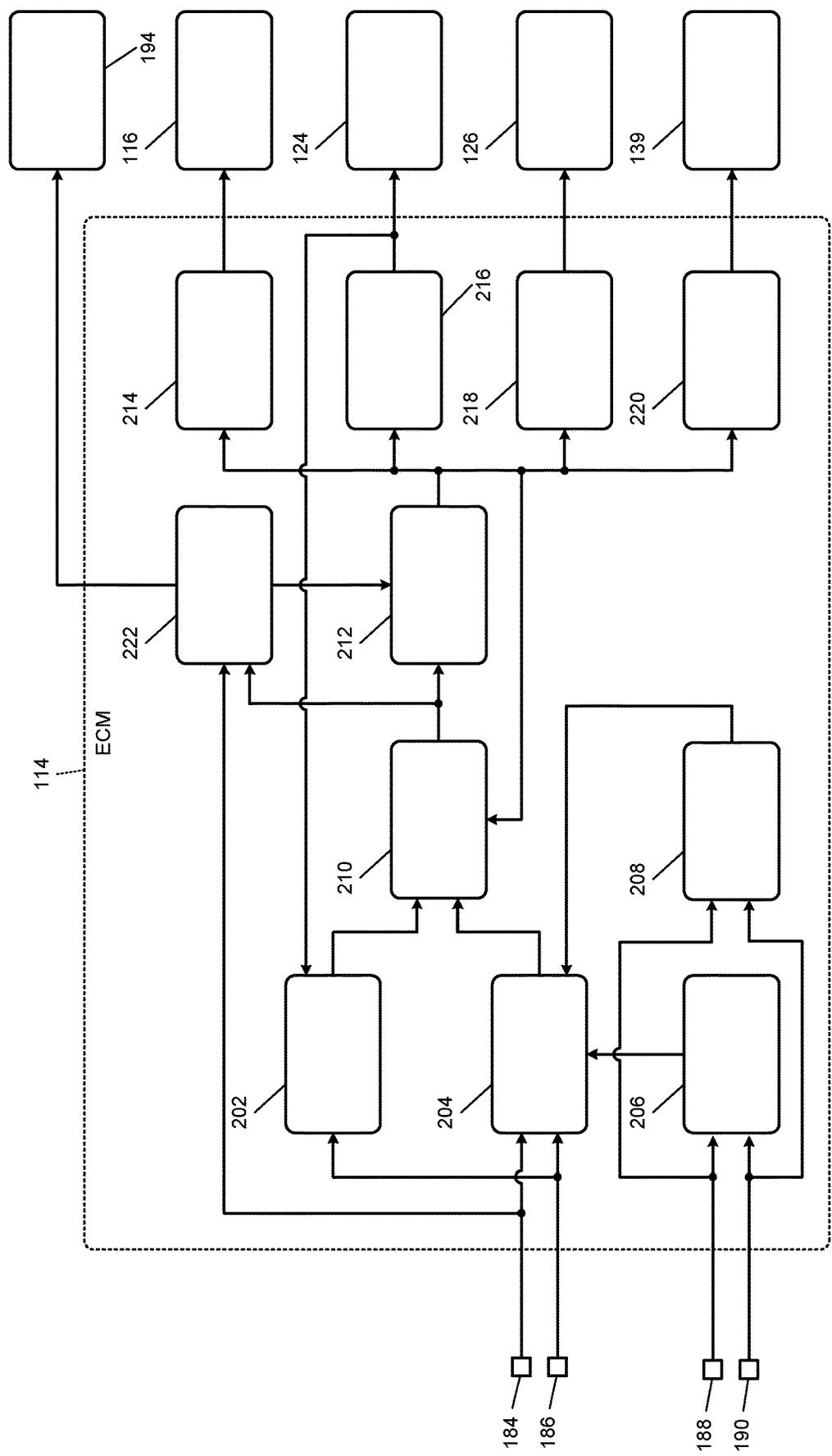
FIG. 2 is a functional block diagram of an example control system according to the principles of the present disclosure.

Referring now to FIG. 2, an example implementation of the ECM 114 includes a three-way catalyst (TWC) sulfur loading module 202, a TWC sulfur unloading module 204, an oxygen (02) flow rate module 206, an O2 storage capacity module 208, and a total TWC sulfur load module 210. The TWC sulfur loading module 202, the TWC sulfur unloading module 204, and the total TWC sulfur load module 210 may be referred to individually or collectively as a TWC sulfur load module. The TWC sulfur loading module 202 determines an increase in the amount of sulfur deposited on the three-way catalyst 166 (the TWC sulfur load) during the current engine cycle. The engine 102 completes one engine cycle each time that the engine 102 completes one firing sequence. In one example, if the engine 102 is a four-stroke cycle engine and all of the cylinders of the engine 102 are active, the engine one of completes one engine cycle after each cylinder of the engine 102 has completed all four strokes.

The TWC sulfur loading module 202 may determine the TWC sulfur load during the current engine cycle based on a commanded fuel injection amount output by the ECM 114 and a level of sulfur in fuel combusted by the engine 102. For example, the TWC sulfur loading module 202 may determine the product of the commanded fuel injection amount and the sulfur level to obtain the TWC sulfur load. The TWC sulfur loading module 202 outputs the TWC sulfur load. The sulfur level may be predetermined based on government regulations on sulfur content of fuels.

The TWC sulfur unloading module 204 determines a decrease in the amount of sulfur deposited on the three-way catalyst 166 (the TWC sulfur unload) during the current engine cycle. The TWC sulfur unloading module 204 may determine the TWC sulfur unload during the current engine cycle based on the exhaust gas temperature, the exhaust gas flow rate, the flow rate of oxygen passing through the three-way catalyst 166, and the oxygen storage capacity of the three-way catalyst 166. The TWC sulfur unloading module 204 may do this using a function, mapping, or model that relates the exhaust gas temperature, the exhaust gas flow rate, the oxygen flow rate, and the oxygen storage capacity to the decrease in the amount of sulfur deposited on the three-way catalyst 166. The TWC sulfur unloading module 204 may receive the exhaust gas temperature and the exhaust gas flow rate from the EGT sensor 184 and the EGF sensor 186, respectively. Additionally or alternatively, the TWC sulfur unloading module 204 may estimate the exhaust gas temperature based on factors that affect combustion in cylinders of the engine 102 (e.g., fuel injection flow rate, intake air flow rate, spark timing, valve timing).

The O2 flow rate module 206 determines the flow rate of oxygen passing through the three-way catalyst 166. The O2 flow rate module 206 may determine the oxygen flow rate based on the oxygen level from one of the O2 sensors 188, 190 and the exhaust gas flow rate from the EGF sensor 186. For example, the O2 flow rate module 206 may determine the product of the oxygen level and the exhaust gas flow rate to obtain the oxygen flow rate. The O2 flow rate module 206 outputs the oxygen flow rate.

The O2 storage capacity module 208 determines the oxygen storage capacity of the three-way catalyst 166. The O2 storage capacity module 208 may determine the oxygen storage capacity based on inputs from the O2 sensors 188, 190. The O2 storage capacity module 208 may determine the oxygen storage capacity based on a time lag from a first time when the output of the upstream O2 sensor 188 indicates a switch from a rich air/fuel ratio to a lean air/fuel ratio to a second time when the output of the downstream O2 sensor 190 indicates that switch. For example, the oxygen storage capacity of the three-way catalyst 166 may be higher when the time lag is longer, and the oxygen storage capacity of the three-way catalyst 166 may be lower when the time lag is shorter. The O2 storage capacity module 208 outputs the oxygen storage capacity of the three-way catalyst 166.

The total TWC sulfur load module 210 determines the total amount of sulfur deposited on the three-way catalyst 166 (the total TWC sulfur load). When DCCO is enabled, the TWC sulfur load module 210 may determine the total TWC sulfur load after the current engine cycle based on the total TWC sulfur load after the previous engine cycle and the TWC sulfur load during the current engine cycle. For example, the TWC sulfur load module 210 may determine the sum of the total TWC sulfur load after the previous engine cycle and the TWC sulfur load during the current engine cycle to obtain the total TWC sulfur load after the current engine cycle.

When DFCO is enabled, the TWC sulfur load module 210 may determine the total TWC sulfur load after the current engine cycle based on the total TWC sulfur load after the previous engine cycle and the TWC sulfur unload during the current engine cycle. For example, the TWC sulfur load module 210 may subtract the TWC sulfur unload during the current engine cycle from the total TWC sulfur load after the previous engine cycle to obtain the total TWC sulfur load after the current engine cycle. The total TWC sulfur load module 210 outputs the total TWC sulfur load.

The example implementation of the ECM 114 shown in FIG. 2 also includes a cylinder/fuel cutoff module 212, a throttle control module 214, a fuel control module 216, a spark control module 218, a valve control module 220, and a TWC temperature module 222. The cylinder/fuel cutoff module 212 determines whether to enable DCCO or DFCO based on the total TWC sulfur load. In one example, the cylinder/fuel cutoff module 212 disables DCCO and enables DFCO when the total TWC sulfur load is greater than a first mass (e.g., 1 gram per liter of catalyst) and the temperature of the three-way catalyst 166 is greater than a first temperature (e.g., a temperature from 580 degrees Celsius (° C.) to 600° C.). The first mass and/or the first temperature may be predetermined. The first temperature may be the minimum temperature at which operating the engine 102 in DFCO reduces the amount of sulfur deposited on the three-way catalyst 166.

Conversely, the cylinder/fuel cutoff module 212 may disable DFCO and enable DCCO when the total TWC sulfur load is less than or equal to the first mass and/or when the temperature of the three-way catalyst 166 less than or equal to the first temperature. The temperature of the three-way catalyst 166 may be measured estimated. In one example, the TWC temperature module 222 estimates the temperature of the three-way catalyst 166 based on the exhaust gas temperature from the EGT sensor 184, and outputs the estimated catalyst temperature to the cylinder/fuel cutoff module 212.

The cylinder/fuel cutoff module 212 activates DFCO when DFCO is enabled and the vehicle 100 is decelerating. The cylinder fuel cutoff module 212 activates DCCO when DCCO is enabled and the vehicle 100 is decelerating. In one example, the cylinder/fuel cutoff module 212 only activates DFCO or DCCO if engine torque demand (e.g., the driver torque request) is less than a threshold (e.g., a predetermined value). The cylinder fuel cutoff module 212 may determine whether the vehicle 100 is decelerating based on the input from the vehicle speed sensor. The cylinder/fuel cutoff module 212 outputs a signal indicating whether DFCO or DCCO is active.

The throttle control module 214 controls the position of the throttle valve 112. When the engine 102 is operating normally, the throttle control module 214 may adjust the throttle valve 214 between an open position and a closed position based on the driver torque request from the torque request module 104. When DFCO is active, the throttle control module 214 may continue to adjust the throttle valve 214 between the open and close positions based on the driver torque request. When DCCO is active, the throttle control module 214 may maintain the throttle valve 214 in the closed position to prevent the flow of intake air to all cylinders of the engine 102. The throttle control module 214 outputs a signal indicating a target position of the throttle valve 214, and the throttle actuator module 116 controls the throttle valve 112 to minimize the difference between the target throttle position and the measured throttle position.

The fuel control module 216 controls the amount of fuel injected by the fuel injectors of the engine 102 (including the fuel injector 125). The fuel control module 216 also controls the timing of the fuel injections. When the engine 102 is operating normally, the fuel control module 216 may control the fuel injectors to inject fuel based on the driver torque request from the torque request module 104. For example, the fuel control module 216 may determine a target fuel injection amount and a target fuel injection timing based on the driver torque request from the driver torque request module 104, and output a signal indicating the target fuel injection amount and timing. The fuel actuator module 124 may then control the fuel injectors of the engine 102 to achieve the target fuel injection amount and timing. The fuel control module 216 may also output the target (or commanded) fuel injection amount to the TWC sulfur loading module 202 for using in determining the TWC sulfur load. When DFCO or DCCO is active, the fuel control module 216 may control the flow injectors to stop fuel injection in all cylinders of the engine 102. For example, the fuel control module 216 may set the target fuel injection amount to zero and, in response, the fuel actuator module 124 may control all of the fuel injectors of the engine 102 to stop injecting fuel.

The spark control module 218 controls the spark plugs of the engine 102 (including the spark plug 128) to generate spark in cylinders of the engine 102. When the engine 102 is operating normally, the spark control module 218 may control the spark plugs of the engine 102 to generate spark based on the driver torque request from the torque request module 104. For example, the spark control module 218 may determine a target spark timing based on the driver torque request from the torque request module 104, and the spark actuator module 26 may control the spark plugs of the engine 102 to achieve the target spark timing. When DFCO is active, the spark control module 218 may continue to control the spark plugs of the engine 102 to generate spark based on the driver torque request. When DCCO is active, the spark control module 218 may control all of the spark plugs of the engine 102 to stop generating spark.

The valve control module 220 controls the opening amount, duration, and start time of the intake and exhaust valves of the engine 102 (including the intake and exhaust valves 122 and 130). When the engine 102 is operating normally, the valve control module 220 may enable actuation of the intake and exhaust valves 122 and 130 between an open position and a closed position based on the driver torque request from the torque request module 104. For example, the valve control module 220 may output a signal indicating target positions of the intake and exhaust valves 122 and 130, and the valve actuator module 139 may control the intake and exhaust valve actuators 136 and 138 to achieve the target valve positions. When DFCO is active, the valve control module 220 may continue to enable actuation of the intake and exhaust valves 122 and 130 between the open and closed positions based on the driver torque request. When DCCO is active, the valve control module 220 may maintain intake and exhaust valves 122 and 130 in their respective closed positions.

The TWC temperature module 222 adjusts the temperature the three-way catalyst 166 based on the total TWC sulfur load. The TWC temperature module 222 may increase the temperature of the three-way catalyst 166 when the total TWC sulfur load is greater than a second mass. The second mass may be predetermined and/or greater than the first mass. The TWC temperature module 222 may increase the temperature of the three-way catalyst 166 by instructing the TCM 194 to adjust the shift schedule of the transmission to increase the power output of the engine 102.

Additionally or alternatively, the TWC temperature module 222 may increase the temperature of the three-way catalyst 166 by instructing the fuel control module 216 to increase an amount of fuel injected into the cylinders of the engine 102 and instructing the valve control module 220 to increase a rate of airflow to the cylinders. The TWC temperature module 222 may output a signal to the cylinder/fuel cutoff module 212 indicating these instructions, and the cylinder/fuel cutoff module 212 may relay these instructions to the fuel control module 216 and the valve control module 220. Alternatively, the TWC temperature module 222 may output the signal directly to the fuel control module 216 and the valve control module 220.

Figure 3:
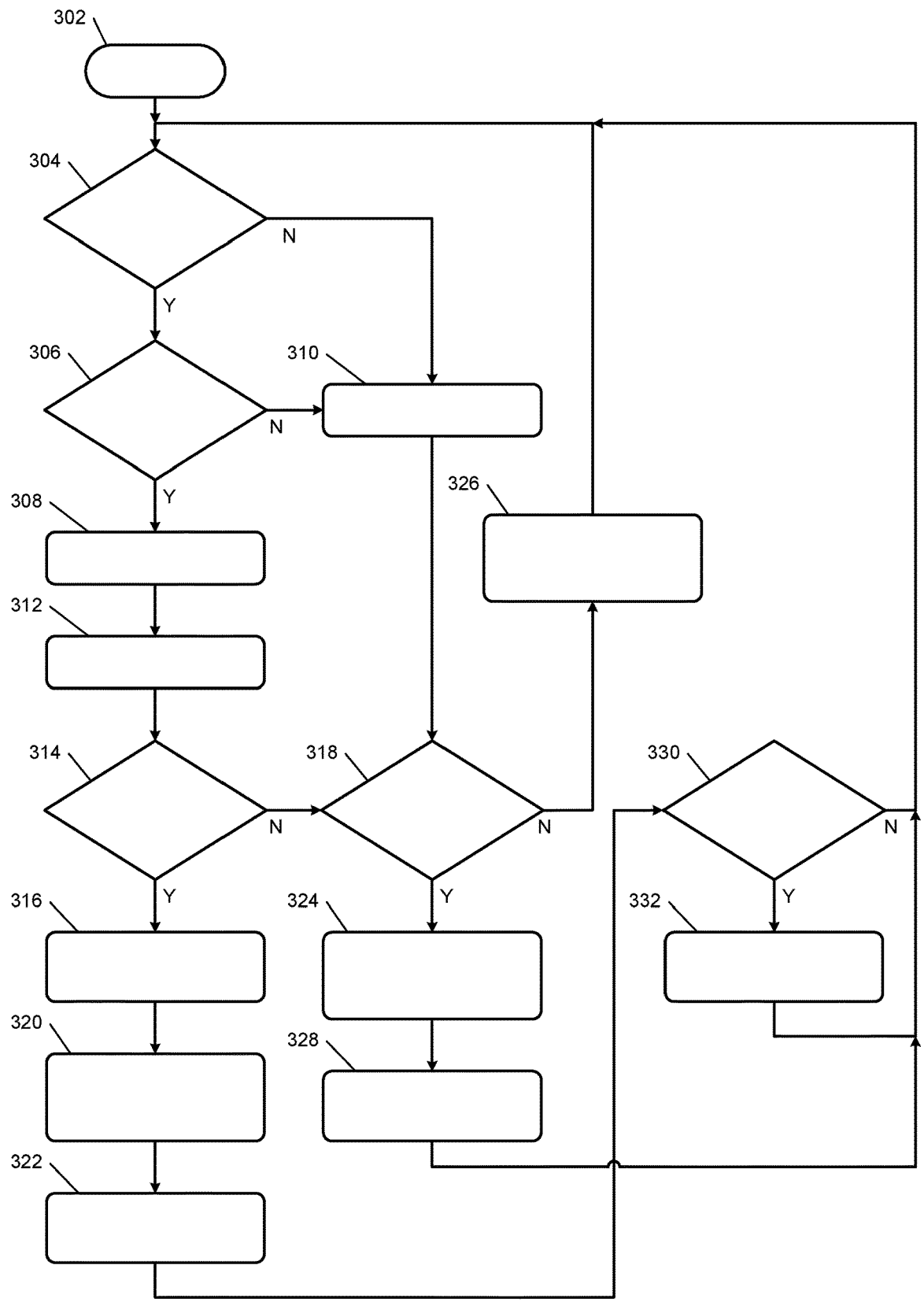
FIG. 3 is a flowchart illustrating an example control method according to the principles of the present disclosure.

Referring now to FIG. 3, a method for controlling the amount of sulfur on the three-way catalyst 166 begins at 302. The method is described in the context of the modules of FIG. 2. However, the particular modules that perform the steps of the method may be different than the modules mentioned below and/or one or more steps of the method may be implemented apart from the modules of FIG. 2.

At 304, the total TWC sulfur load module 210 determines whether the total TWC sulfur load is greater than the first mass. For example, the total TWC sulfur load module 210 may determine whether the total TWC sulfur load determined at 322 or 328 is greater than the first mass. If the total TWC sulfur load is greater than the first mass, the method continues at 306. Otherwise, the method continues at 310. At 310, the cylinder/fuel cutoff module 212 enables DCCO. Before enabling DCCO, the cylinder/fuel cutoff module 212 may disable DFCO.

At 308, the cylinder/fuel cutoff module 212 disables DCCO. At 312, the cylinder/fuel cutoff module 212 enables DFCO. At 314, the total TWC sulfur load module 210 determines whether DFCO is active. If DFCO is active, the method continues at 316. Otherwise, the method continues at 318.

At 316, the O2 storage capacity module 208 estimates the oxygen storage capacity of the three-way catalyst 166. At 320, the TWC sulfur unloading module 208 determines the TWC sulfur unload for the current engine cycle. At 322, the total TWC sulfur load module 210 determines the total TWC sulfur load at the end of the current engine cycle based on the total TWC sulfur load at the end of the previous engine cycle and the TWC sulfur unload for the current engine cycle.

At 318, the total TWC sulfur load module 210 determines whether the equalization ratio of the engine 102 is greater than a first value (e.g., 0.95). When the equalization ratio of the engine 102 is greater than the first value, the air/fuel ratio of the engine 102 may be stoichiometric or rich. When the equalization ratio of the engine 102 is less than the first value, the air/fuel ratio of the engine 102 may be lean. If the equalization ratio of the engine is greater than the first value, the method continues at 324. Otherwise, the method continues at 326. At 326, the total TWC sulfur load module 210 does not adjust the total TWC sulfur load for the current engine cycle. In other words, the total TWC sulfur load module 210 may only adjust the total TWC sulfur load for the current engine cycle when DFCO is not active and the air/fuel ratio of the engine 102 is stoichiometric or rich. Alternatively, the TWC sulfur loading module 202 may set the TWC sulfur load for the current engine cycle to zero when the air fuel ratio of the engine 102 is stoichiometric or rich.

At 324, the TWC sulfur loading module 202 determines the TWC sulfur load for the current engine cycle based on the commanded fuel injection amount and the fuel sulfur level as described above with reference to FIG. 2. At 328, the total TWC sulfur load module 210 determines the total TWC sulfur load at the end of the current engine cycle based on the total TWC sulfur load at the end of the previous engine cycle and the TWC sulfur load for the current engine cycle.

At 330, the TWC temperature module 222 determines whether the total TWC sulfur load is greater than the second mass. If the total TWC sulfur load is greater than the second mass, the method continues at 332. Otherwise, the method returns to 304. At 332, the TWC temperature module 222 increases the temperature of the three-way catalyst 166.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
a three-way catalyst (TWC) sulfur load module configured to determine an amount of sulfur deposited on a three-way catalyst of an engine in a vehicle;
a cylinder/fuel cutoff module configured to determine whether to enable deceleration cylinder cutoff (DCCO) based on the amount of sulfur deposited on the three-way catalyst;
a fuel control module configured to control a fuel injector to selectively stop fuel injection in the engine when DCCO is enabled; and
a valve control module configured to selectively maintain intake and exhaust valves of the engine in a closed position when DCCO is enabled.

2. The system of claim 1 wherein when DCCO is enabled, the TWC sulfur load module is configured to selectively determine the amount of sulfur deposited on the three-way catalyst based on a previous value of the amount of sulfur deposited on the three-way catalyst and an increase in the amount of sulfur deposited on the three-way catalyst during a current engine cycle.

3. The system of claim 2 wherein when DCCO is enabled and an air/fuel ratio of the engine is stoichiometric or rich, the TWC sulfur load module is configured to determine the amount of sulfur deposited on the three-way catalyst based on the previous value of the amount of sulfur deposited on the three-way catalyst and the increase in the amount of sulfur deposited on the three-way catalyst during the current engine cycle.

4. The system of claim 2 wherein the TWC sulfur load module is configured to determine the increase in the amount of sulfur deposited on the three-way catalyst during the current engine cycle based on a commanded fuel injection amount and a level of sulfur in fuel combusted by the engine.

5. The system of claim 1 wherein:
the cylinder/fuel cutoff module is configured to enable one of DCCO and deceleration fuel cutoff (DFCO) based on the amount of sulfur deposited on the three-way catalyst;
the fuel control module is configured to control the fuel injector to selectively stop fuel injection in the engine when one of DCCO and DFCO is enabled; and
the valve control module is configured to enable actuation of the intake and exhaust valves between an open position and the closed position when DFCO is enabled.

6. The system of claim 5 wherein:
the cylinder/fuel cutoff module is configured to activate DFCO when DFCO is enabled and the vehicle is decelerating; and
the fuel control module is configured to control the fuel injector to stop fuel delivery to all cylinders of the engine when DFCO is active.

7. The system of claim 5 wherein the cylinder/fuel cutoff module is configured to selectively enable DFCO when the amount of sulfur deposited on the three-way catalyst is greater than a first mass.

8. The system of claim 7 wherein the cylinder/fuel cutoff module is configured to enable DFCO when the amount of sulfur deposited on the three-way catalyst is greater than the first mass and a temperature of the three-way catalyst is greater than a first temperature.

9. The system of claim 8 wherein the cylinder/fuel cutoff module is configured to enable DCCO when at least one of:
the amount of sulfur deposited on the three-way catalyst is less than or equal to the first mass; and
the temperature of the three-way catalyst is less than or equal to the first temperature.

10. The system of claim 9 wherein:
the cylinder/fuel cutoff module is configured to activate DCCO when DCCO is enabled and the vehicle is decelerating;
the fuel control module is configured to control the fuel injector to stop fuel delivery to all cylinders of the engine when DCCO is active; and
the valve control module is configured to maintain the intake and exhaust valves of all cylinders in the engine in the closed position when DCCO is active.

11. The system of claim 7 further comprising a three-way catalyst (TWC) temperature module configured to increase the temperature of the three-way catalyst when the amount of sulfur deposited on the three-way catalyst is greater than a second mass, wherein the second mass is greater than the first mass.

12. The system of claim 11 wherein the TWC temperature module is configured to increase the temperature of the three-way catalyst by instructing the fuel control module to increase an amount of fuel injected into cylinders of the engine and instructing the valve control module to increase a rate of airflow to the cylinders.

13. The system of claim 5 wherein when DFCO is enabled, the TWC sulfur load module is configured to determine the amount of sulfur deposited on the three-way catalyst based on a previous value of the amount of sulfur deposited on the three-way catalyst and a decrease in the amount of sulfur deposited on the three-way catalyst during a current engine cycle.

14. The system of claim 13 wherein the TWC sulfur load module is configured to determine the decrease in the amount of sulfur deposited on the three-way catalyst during the current engine cycle based on a temperature of exhaust gas produced by the engine, a flow rate of exhaust gas produced by the engine, a flow rate of oxygen passing through the three-way catalyst, and an oxygen storage capacity of the three-way catalyst.

15. The system of claim 14 further comprising an oxygen storage capacity module configured to determine the oxygen storage capacity of the three-way catalyst based on an input from an oxygen sensor disposed at an inlet of the three-way catalyst and an input from an oxygen sensor disposed at an outlet of the three-way catalyst or between the inlet and the outlet.

16. A system comprising:
a three-way catalyst (TWC) sulfur load module configured to determine an amount of sulfur deposited on a three-way catalyst of an engine in a vehicle;
a cylinder/fuel cutoff module configured to:
enable deceleration cylinder cutoff (DCCO) when at least one of:
the amount of sulfur deposited on the three-way catalyst is less than or equal to a first mass; and
a temperature of the three-way catalyst is less than or equal to a first temperature; and
enable deceleration fuel cutoff (DFCO) when the amount of sulfur deposited on the three-way catalyst is greater than the first mass and the temperature of the three-way catalyst is greater than the first temperature;

a fuel control module configured to control a fuel injector to stop fuel injection in the engine when one of DCCO and DFCO is enabled and the vehicle is decelerating; and a valve control module configured to:
   maintain intake and exhaust valves of the engine in a closed position when DCCO is enabled and the vehicle is decelerating; and
   enable actuation of the intake and exhaust valves between an open position and the closed position when DFCO is enabled.

17. The system of claim 16 wherein when DCCO is enabled, the TWC sulfur load module is configured to determine that the amount of sulfur deposited on the three-way catalyst is equal to a sum of a previous value of the amount of sulfur deposited on the three-way catalyst and an increase in the amount of sulfur deposited on the three-way catalyst during a current engine cycle.

18. The system of claim 17 wherein the TWC sulfur load module is configured to determine that the increase in the amount of sulfur deposited on the three-way catalyst during the current engine cycle is equal to a product of a commanded fuel injection amount and a level of sulfur in fuel combusted by the engine.

19. The system of claim 16 wherein when DFCO is enabled, the TWC sulfur load module is configured to determine that the amount of sulfur deposited on the three-way catalyst is equal to a difference between a previous value of the amount of sulfur deposited on the three-way catalyst and a decrease in the amount of sulfur deposited on the three-way catalyst during a current engine cycle.

20. The system of claim 19 wherein the TWC sulfur load module is configured to determine the decrease in the amount of sulfur deposited on the three-way catalyst during the current engine cycle based on a temperature of exhaust gas produced by the engine, a flow rate of exhaust gas produced by the engine, a flow rate of oxygen passing through the three-way catalyst, and an oxygen storage capacity of the three-way catalyst.

* * * * *